(12) United States Patent
Greiner et al.

(10) Patent No.: US 9,618,708 B2
(45) Date of Patent: Apr. 11, 2017

(54) MULTIPLEXER/DEMULTIPLEXER BASED ON DIFFRACTIVE OPTICAL ELEMENTS

(71) Applicant: Finisar Corporation, Sunnyvale, CA (US)

(72) Inventors: Christoph M. Greiner, Eugene, OR (US); Thomas W. Mossberg, Eugene, OR (US); Dmitri Iazikov, Eugene, OR (US)

(73) Assignee: Finisar Corporation, Sunnyvale, CA (US)

( * ) Notice: Subject to any disclaimer, the term of this patent is extended or adjusted under 35 U.S.C. 154(b) by 7 days.

(21) Appl. No.: 14/541,072

(22) Filed: Nov. 13, 2014

(65) Prior Publication Data

US 2015/0132003 A1    May 14, 2015

Related U.S. Application Data (60) Provisional application No. 61/903,934, filed on Nov. 13, 2013, provisional application No. 61/906,887, filed on Nov. 20, 2013.

(51) Int. Cl.
*H04B 10/00* (2013.01)
*G02B 6/42* (2006.01)
*G02B 6/293* (2006.01)

(52) U.S. Cl.
CPC .......... *G02B 6/4215* (2013.01); *G02B 6/2938* (2013.01); *G02B 6/29367* (2013.01)

(58) Field of Classification Search
USPC ................ 359/558–576; 385/37; 398/79–88
See application file for complete search history.

(56) References Cited

U.S. PATENT DOCUMENTS

| | | | | |
|---|---|---|---|---|
| 5,119,454 A | * | 6/1992 | McMahon | G02B 6/2931 359/290 |
| 5,825,523 A | * | 10/1998 | Amitai | G02B 26/0808 359/209.1 |

(Continued)

OTHER PUBLICATIONS

Co-owned U.S. Appl. No. 14/578,420, filed Dec. 20, 2014.

*Primary Examiner* — Agustin Bello
(74) *Attorney, Agent, or Firm* — David S. Alavi (57) ABSTRACT

A first transmissive diffraction grating includes a multiplexed transmission region; a second diffraction grating includes multiple demultiplexed transmission regions that are spatially displaced from one another and characterized by average corresponding grating-normal vector direction, grating wavevector magnitude, and grating wavevector direction. The demultiplexed transmission regions differ with respect to at least one of those parameters. The gratings are arranged such that each one of multiple optical signals at corresponding different wavelengths co-propagating to the multiplexed transmission region along a multiplexed beam path would: (i) be transmissively, dispersively diffracted by the first diffractive optical element; (ii) propagate directly, without any intervening reflection, between the multiplexed transmission region and a corresponding one of the demultiplexed transmission regions; (iii) be transmissively, dispersively diffracted by the second diffractive optical element; and (iv) propagate from the corresponding demultiplexed transmission region along a corresponding one of multiple demultiplexed beam paths.

31 Claims, 8 Drawing Sheets

(56) References Cited

U.S. PATENT DOCUMENTS

| | | | | |
|---|---|---|---|---|
| 6,008,920 A | * | 12/1999 | Hendrix | G02B 6/2938 359/633 |
| 6,278,534 B1 | * | 8/2001 | Arns | G01J 3/02 356/334 |
| 6,292,298 B1 | * | 9/2001 | Glance | G02B 6/29358 359/583 |
| 6,404,947 B1 | * | 6/2002 | Matsuda | B82Y 20/00 372/50.1 |
| 6,404,958 B1 | * | 6/2002 | Boye | G02B 6/2713 385/39 |
| 6,485,149 B1 | * | 11/2002 | Berg | G02B 5/265 359/558 |
| 6,539,149 B1 | * | 3/2003 | Barbarossa | G02B 6/12007 359/571 |
| 6,591,035 B2 | * | 7/2003 | Miller | G02B 5/285 385/24 |
| 6,765,724 B1 | * | 7/2004 | Kramer | 359/883 |
| 6,823,106 B2 | * | 11/2004 | Takushima | B82Y 20/00 257/E27.112 |
| 6,823,112 B2 | * | 11/2004 | Deliwala | G02B 5/1866 356/328 |
| 6,900,939 B2 | * | 5/2005 | Hoshi | G02B 6/272 385/100 |
| 6,965,475 B2 | * | 11/2005 | Shiozaki | G02B 5/1866 250/237 G |
| 6,999,235 B2 | * | 2/2006 | Nakamura | G02B 5/1814 359/566 |
| 7,120,361 B2 | * | 10/2006 | Tei | G02B 5/1847 359/353 |
| 7,230,761 B2 | * | 6/2007 | Arns | G02B 6/29367 359/629 |
| 7,233,443 B1 | * | 6/2007 | Carlisle | G02B 1/005 385/37 |
| 7,440,654 B2 | * | 10/2008 | Kirk | G02B 6/29311 385/37 |
| 7,460,302 B2 | * | 12/2008 | Amitai | G02B 5/1866 359/569 |
| 7,480,428 B2 | * | 1/2009 | Tien | G02B 6/29311 385/131 |
| 7,538,945 B2 | * | 5/2009 | Hikichi | G02B 5/1871 359/566 |
| 7,599,061 B1 | * | 10/2009 | Ting | B82Y 20/00 356/326 |
| 7,719,767 B2 | * | 5/2010 | Lin | G02B 6/0036 349/62 |
| 7,805,033 B2 | * | 9/2010 | Pitwon | G02B 6/12011 385/24 |
| 8,303,195 B2 | * | 11/2012 | Adachi | G02B 6/4204 385/73 |
| 8,649,680 B2 | * | 2/2014 | Okamoto | G02B 5/32 398/143 |
| 8,811,823 B2 | * | 8/2014 | Amitai | G02B 5/1866 359/569 |
| 2002/0085801 A1 | * | 7/2002 | Okayama | B82Y 20/00 385/24 |
| 2002/0181048 A1 | * | 12/2002 | Kuykendall, Jr. | G02B 5/32 398/87 |
| 2003/0223117 A1 | * | 12/2003 | Nakazawa | G02B 6/1225 359/576 |
| 2004/0008437 A1 | * | 1/2004 | Kittaka | B82Y 20/00 359/883 |
| 2007/0127869 A1 | * | 6/2007 | Kirk | G02B 27/4244 359/15 |
| 2007/0154142 A1 | * | 7/2007 | Tien | G02B 6/2706 359/571 |
| 2009/0310963 A1 | * | 12/2009 | Amitai | G02B 5/1866 398/43 |
| 2015/0132003 A1 | * | 5/2015 | Greiner | G02B 6/4215 398/87 |

* cited by examiner

MULTIPLEXER/DEMULTIPLEXER BASED ON DIFFRACTIVE OPTICAL ELEMENTS

BENEFIT CLAIMS TO RELATED APPLICATIONS

This application claims benefit of (i) U.S. provisional App. No. 61/903,934 filed Nov. 13, 2013 in the names of Christoph M. Greiner, Thomas W. Mossberg, and Dmitri lazikov, and (ii) U.S. provisional App. No. 61/906,887 filed Nov. 20, 2013 in the names of Christoph M. Greiner, Thomas W. Mossberg, and Dmitri lazikov; both of said provisional applications are incorporated by reference as if fully set forth herein.

BACKGROUND

The field of the present invention relates to optical multiplexers and demultiplexers. In particular, apparatus and methods are shown and described herein for multiplexing or demultiplexing optical signals at differing wavelengths using multiple diffractive optical elements.

SUMMARY

An optical apparatus comprises first and second transmissive diffractive optical elements. The first and second diffractive optical elements are held in substantially fixed positions relative to one another. The first diffractive optical element includes a multiplexed transmission region characterized by a corresponding average grating-normal vector direction, a corresponding average grating wavevector magnitude, and a corresponding average grating wavevector direction. The second diffractive optical element includes multiple demultiplexed transmission regions that are spatially displaced from one another, each of which is characterized by a corresponding average grating-normal vector direction, a corresponding average grating wavevector magnitude, and a corresponding average grating wavevector direction; each demultiplexed transmission region differs from at least one other demultiplexed transmission region with respect to one or more of the grating-normal vector direction, the grating wavevector magnitude, or the grating wavevector direction. The relative positions of the first and second diffractive optical elements, the grating-normal vector directions, the grating wavevector magnitudes, and the grating wavevector directions are such that each one of a set of multiple optical signals, at corresponding different selected signal wavelengths in an operational wavelength range, co-propagating to the multiplexed transmission region along a multiplexed beam path would: (i) be transmissively, dispersively diffracted by the first diffractive optical element; (ii) propagate directly, without any intervening reflection, between the multiplexed transmission region and a corresponding one of the demultiplexed transmission regions; (iii) be transmissively, dispersively diffracted by the second diffractive optical element; and (iv) propagate from the corresponding demultiplexed transmission region along a corresponding one of multiple demultiplexed beam paths.

An optical apparatus acting as a demultiplexer further comprises a set of multiple photodetectors sensitive to optical signals in the operational wavelength range. Each photodetector is positioned so as to receive an optical signal in the operational wavelength range propagating from a corresponding one of the demultiplexed transmission regions along the corresponding one of the demultiplexed beam paths.

An optical apparatus acting as a multiplexer further comprises a set of multiple light sources. Each light source emits an optical signal at one of the selected wavelengths in the operational wavelength range and is positioned so as to launch that optical signal to propagate (i) from the light source along a corresponding one of the demultiplexed beam paths to the corresponding demultiplexed transmission region, (ii) from the corresponding demultiplexed transmission region to the multiplexed transmission region, and (iii) along the multiplexed beam path.

An optical apparatus acting as a multiplexer or demultiplexer therefore includes multiple diffractive optical elements arranged (i) to demultiplex multiple optical signals emerging, e.g., from an optical fiber or other transmission medium and carrying corresponding optical telecommunications signals (e.g., voice, data, and so on) onto an array of corresponding photodetectors in an optical receiver, or (ii) to multiplex multiple optical signals carrying corresponding optical telecommunications signals generated by an array of corresponding light sources (e.g., laser diodes such as VCSELs) onto, e.g., an optical fiber or other optical transmission medium.

Objects and advantages pertaining to optical multiplexers or demultiplexers may become apparent upon referring to the example embodiments illustrated in the drawings or disclosed in the following written description or appended claims. Subject matter disclosed herein may be related to subject matter disclosed in (i) U.S. provisional App. No. 61/919,683 filed Dec. 20, 2013 in the names of Christoph M. Greiner, Thomas W. Mossberg, and Dmitri lazikov, and (ii) U.S. provisional App. No. 61/927,469 filed Jan. 14, 2014 in the names of Christoph M. Greiner, Thomas W. Mossberg, and Dmitri lazikov; both of said provisional applications are incorporated by reference as if fully set forth herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The embodiments depicted are shown only schematically: all features may not be shown in full detail or in proper proportion, certain features or structures may be exaggerated relative to others for clarity, and the drawings should not be regarded as being to scale. For example, the actual diffractive lines or ridges or other diffractive features of the diffractive optical elements (e.g., typically hundreds or thousands of grating lines per millimeter) are omitted from the drawings for clarity. The embodiments shown are only examples: they should not be construed as limiting the scope of the present disclosure or appended claims.

DETAILED DESCRIPTION OF EMBODIMENTS

Figure 1:
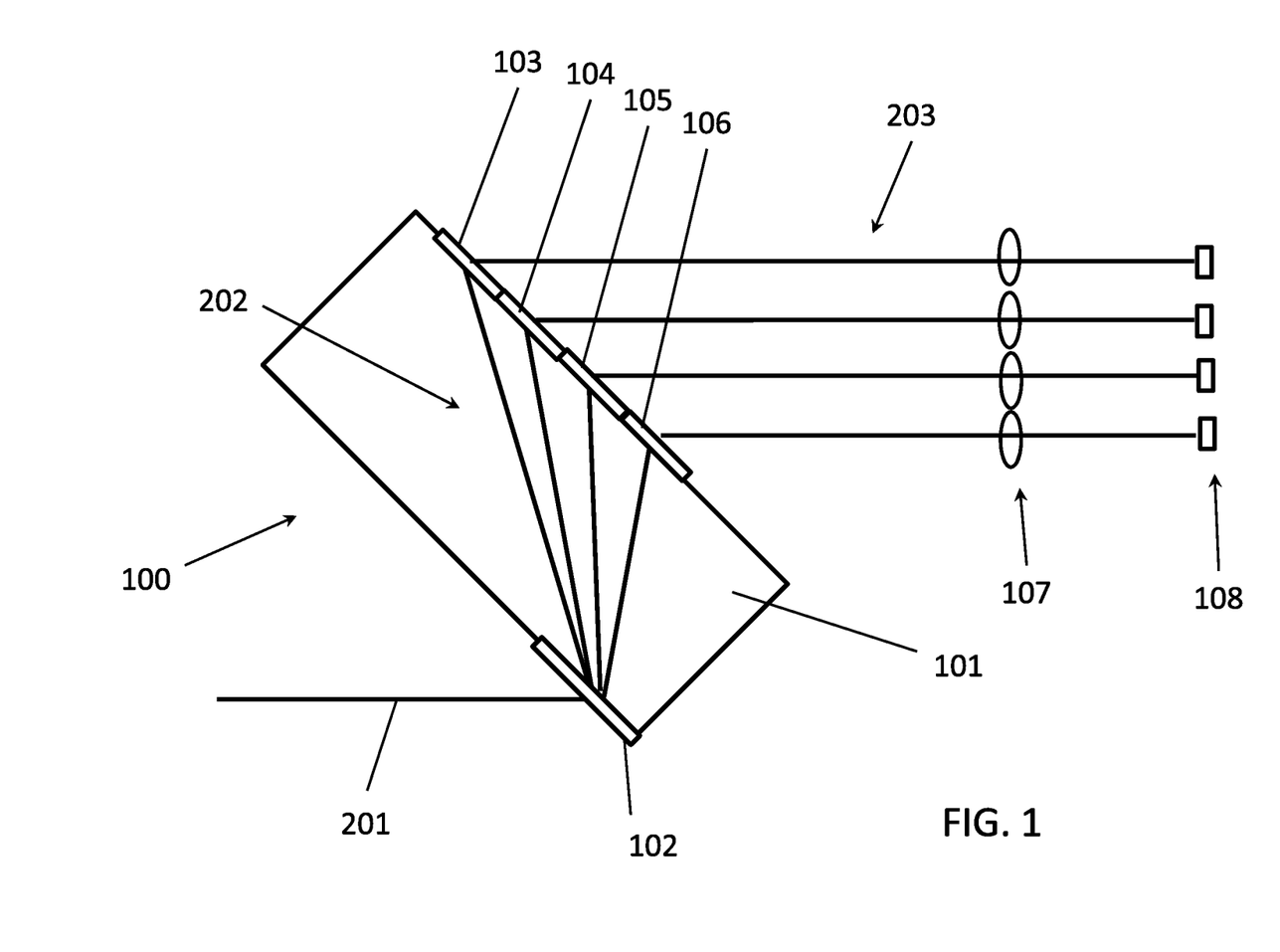
FIGS. 1 through 8 illustrate schematically various example embodiments of an optical multiplexer or demultiplexer based on diffractive optical elements.

Shown in FIG. 1 is an input multiplexed optical signal propagating along a multiplexed beam path 201 towards an optical component 100, i.e., a demultiplexer unit. The multiplexed optical signal includes multiple co-propagating modulated optical signals of different selected carrier wavelengths within an operational wavelength range (e.g., about 800-900 nm or about 1200-1700 nm for typical telecommunications use; other suitable operational wavelength ranges can be employed), each one carrying a corresponding telecommunications signal (e.g., voice, data, or other). The demultiplexer unit 100 comprises an input diffractive optical element 102 (e.g., a transmissive optical diffraction grating), an optical spacer 101, and an output diffractive optical element comprising multiple elements 103 through 106 (e.g., transmissive optical diffraction gratings 103 through 106; four output gratings are shown and described, but any suitable, needed, or desired number of output gratings can be employed within the scope of the present disclosure). The multiplexed input optical signal impinges on a multiplexed transmission region of the input diffractive optical element 102 at a given incidence angle with respect to its grating-normal vector.

The input diffractive optical element 102 transmissively, dispersively diffracts the co-propagating optical signals of different wavelengths into a fan of diffracted signals 202 according to the grating equation and the grating-normal vector direction, grating wavevector magnitude, and grating wavevector direction that characterize the multiplexed transmission region of the input diffractive optical element 102. The grating equation is $n_A \sin\theta_{in} + n_S \sin\theta_{d,m} = m\lambda/\Lambda$, where m designates the diffracted order (zero, ±1, ±2, and so on), $\theta_{in}$ is the incidence angle (relative to the grating-normal vector), $\theta_{d,m}$ is the diffracted angle (relative to the grating-normal vector) for the mth diffracted order, and $n_A$ and $n_S$ are the refractive indices of ambient and substrate media, respectively. Simple, non-dispersive transmission (i.e., refraction) satisfies the grating equation for m=0 (zeroth order); non-zero-order diffracted orders are those that satisfy the grating equation for m≠0 and result in dispersive diffraction, so that the angle at which each individual optical signal is diffracted depends on its corresponding wavelength. Transmissive diffraction gratings employed in multiplexers or demultiplexers disclosed or claimed herein can be realized, e.g., as grooves or ridges, as periodic or quasi-periodic index modulations, employing a single material or multiple materials (such as disclosed in U.S. Pat. No. 8,165,436, which is incorporated by reference as if fully set forth herein), or in any other suitable way.

The wavelength-dispersed input optical signals propagate inside the optical spacer 101 without any intervening reflection; the optical spacer 101 comprises solid material that is substantially transparent over the selected operational wavelength range. Suitable materials include, e.g., optical glasses of various types, silica, doped silica, polymers or resins, dielectric materials, semiconductor materials, or other suitable materials. At the opposing side of the optical spacer 101 the diffracted optical signals impinge on the output transmissive diffraction gratings 103 through 106. The thickness of the optical spacer 101 is chosen to be large enough so that optical signals of differing wavelengths are spatially separated at the opposing surface, i.e., they do not spatially overlap, upon impinging on the output diffractive optical elements 103 through 106 at corresponding demultiplexed transmission regions of the output diffractive optical element. The output optical diffractive elements 103 through 106 transmissively, dispersively diffract the spatially separated optical signals to propagate along a set of multiple corresponding demultiplexed beam paths 203. Each optical signal of the set has a different optical carrier wavelength and propagates along a different corresponding demultiplexed beam path 203. An array of lenses 107 (e.g., singlet lenses, ball lenses, compound lenses, diffractive lenses, Fresnel lenses, or GRIN lenses) or other suitable focusing optical elements can be arranged to focus the corresponding spatially separated demultiplexed beam paths 203 onto an array of corresponding photodetectors 108, thereby optically coupling each demultiplexed beam path 203 to a corresponding photodetector 108. Each photodetector 108 of the array receives the signal of only one corresponding demultiplexed beam 203 at its corresponding wavelength.

The demultiplexer unit 101 can operate as a multiplexer by replacing the photodetectors 108 with corresponding light sources 108, e.g., laser diodes such as VCSELs (any suitable light source can be employed). When operating as a multiplexer unit the paths of the optical signals are reversed; unit 100 combines the initially spatially separate input optical signals propagating along the corresponding demultiplexed beam paths 203 of differing wavelengths generated by the array of light sources 108 into a combined (i.e., multiplexed) output optical signal propagating along the multiplexed beam path 201 of co-propagating optical signals of differing optical carrier wavelengths. In a multiplexer arrangement the gratings 103 through 106 act as input elements and the diffractive optical element 102 acts as an output element. Lenses 107 (if present) can serve to optically couple each light source 108 and a corresponding demultiplexed beam path 203. Any example embodiment shown or described herein can be operated as a demultiplexer or as a multiplexer; any apparatus claimed at least in part by recitation of propagation or diffraction in one direction can be used for propagation or diffraction in either or both directions, and the scope of such a claim shall encompass both unless excluded by another portion of that claim.

In one example of the arrangement of FIG. 1 (operating as a demultiplexer), the multiplexed input optical signal propagating along multiplexed beam path 201 can include four different optical signals with wavelength 850 nm, 880 nm, 910 nm, and 940 nm; those input signals are incident on the multiplexed transmission region of diffractive optical element 102 at an incidence angle of about 45°. The input diffractive optical element 102 and the output diffractive optical element (gratings 103 through 106 in this example) can be substantially identical transmission gratings with substantially parallel grating lines of substantially constant pitch or spacing, e.g., about 650 nm; the output gratings 103 through 106 can comprise separate gratings (as in FIG. 1) or can comprise distinct areas of a single grating 110 (as in FIG. 2). The optical spacer 101 can comprise fused silica, can be about 6.5 mm thick, and can have substantially parallel opposing surfaces on which are positioned the diffractive optical elements (so that the diffracted signals are incident on corresponding demultiplexed transmission regions of the output gratings 103 through 106 at substantially the same corresponding angles as each was diffracted from the input element 102). In this example, the output optical signals emerge from the demultiplexer 100 and propagate along corresponding demultiplexed beam paths 203 substantially parallel to the multiplexed beam path 201 and to one another, with an approximate inter-beam lateral separation of 250 μm.

Figure 2:
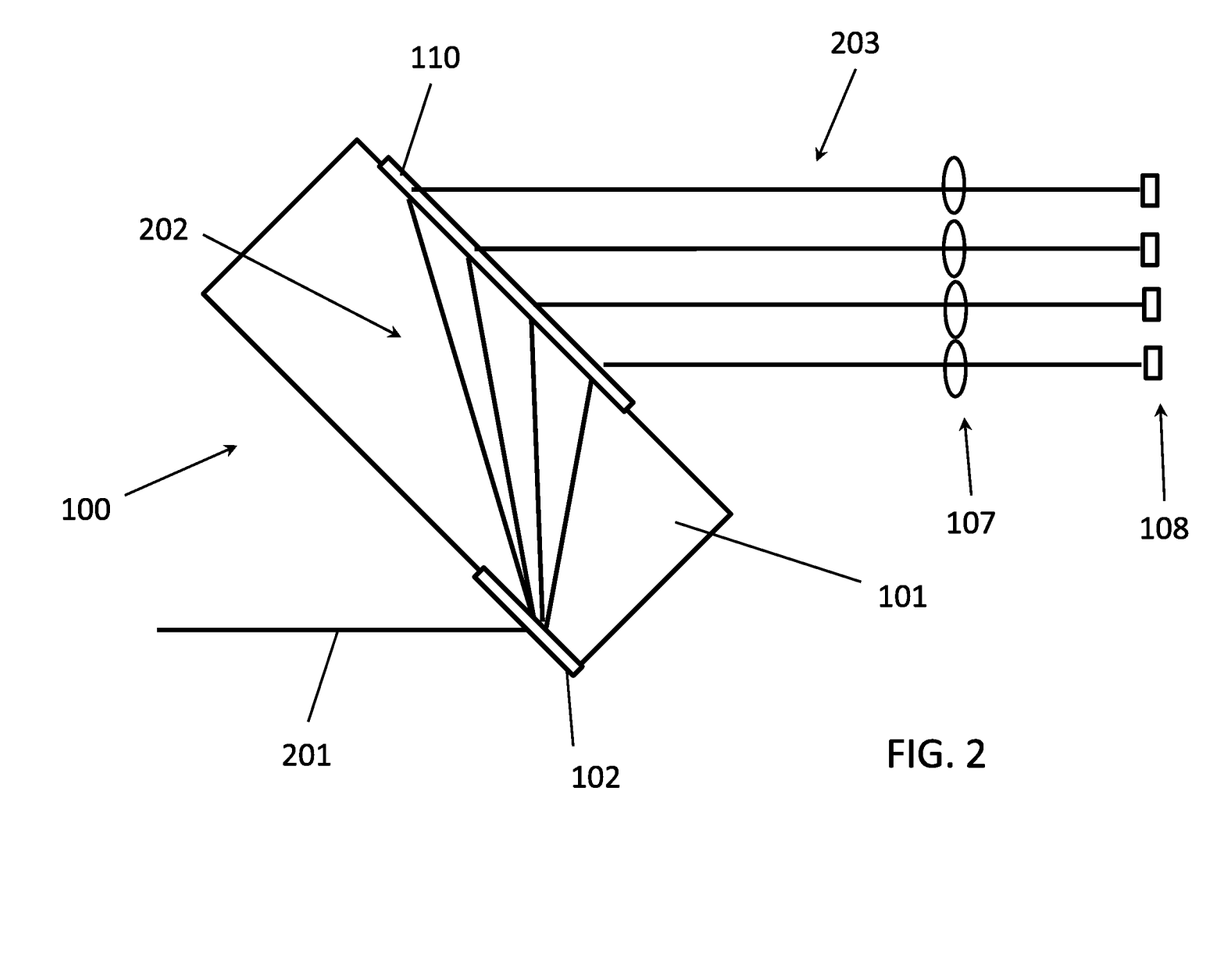

One advantage provided by the example arrangement of the disclosed demultiplexer shown in FIGS. 1 and 2 (i.e., the arrangement of the input and output gratings, which have the same grating line spacings, on the substantially parallel opposing faces of the optical spacer 101) is reduction or elimination of wavelength-dependent angular deflection of the demultiplexed beam paths 203 relative to the multiplexed beam path 201. The wavelength-dependent angular dispersion imparted by the input grating 102 is substantially cancelled by the wavelength-dependent angular dispersion imparted by the gratings 103 through 106 (FIG. 1) or grating 110 (FIG. 2); as a result, the demultiplexed beam paths 203 are substantially parallel to each other and to the propagation direction of multiplexed beam path 201; the optical signals of differing wavelengths propagating along the demultiplexed beam paths 203 are spatially separated from one another.

Figure 3:
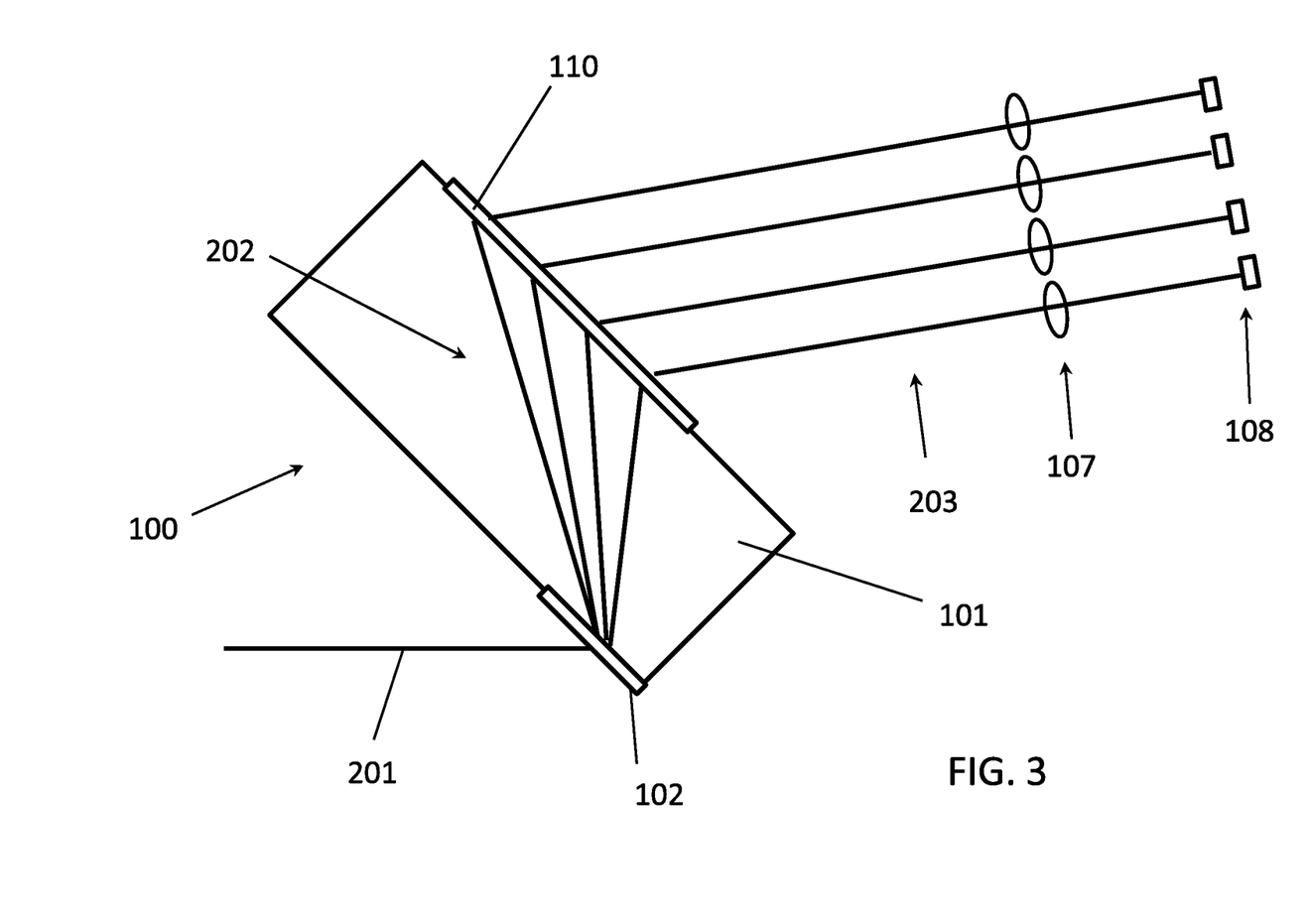

The example arrangement of FIG. 3 is similar to that of FIG. 2 (i.e., the arrangement of the input and output diffractive optical elements 102 and 110 on the substantially parallel opposing faces of the optical spacer 101), except that the input and output diffractive optical elements have differing grating line spacings (i.e., differing grating wavevector magnitudes, resulting in differing wavelength-dependent angular dispersions). As a result of that difference, the demultiplexed beam paths 203 are not parallel to the multiplexed beam path 102. The propagation directions of the demultiplexed beam paths 203 typically are not parallel to one another (except perhaps for certain fortuitous combinations of incidence angle, wavelengths, and grating line densities), but instead vary with wavelength.

Figure 4:
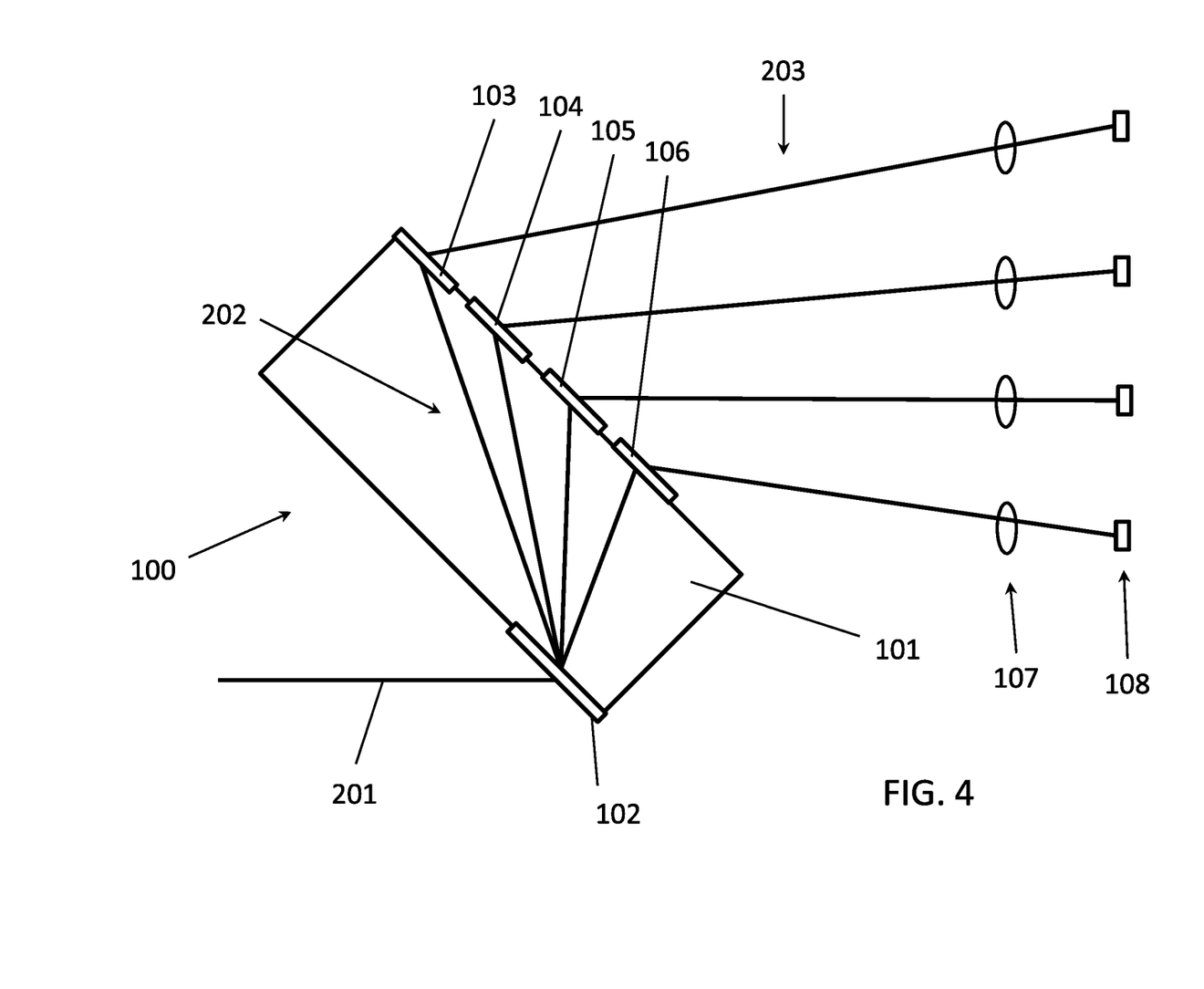
Figure 5:
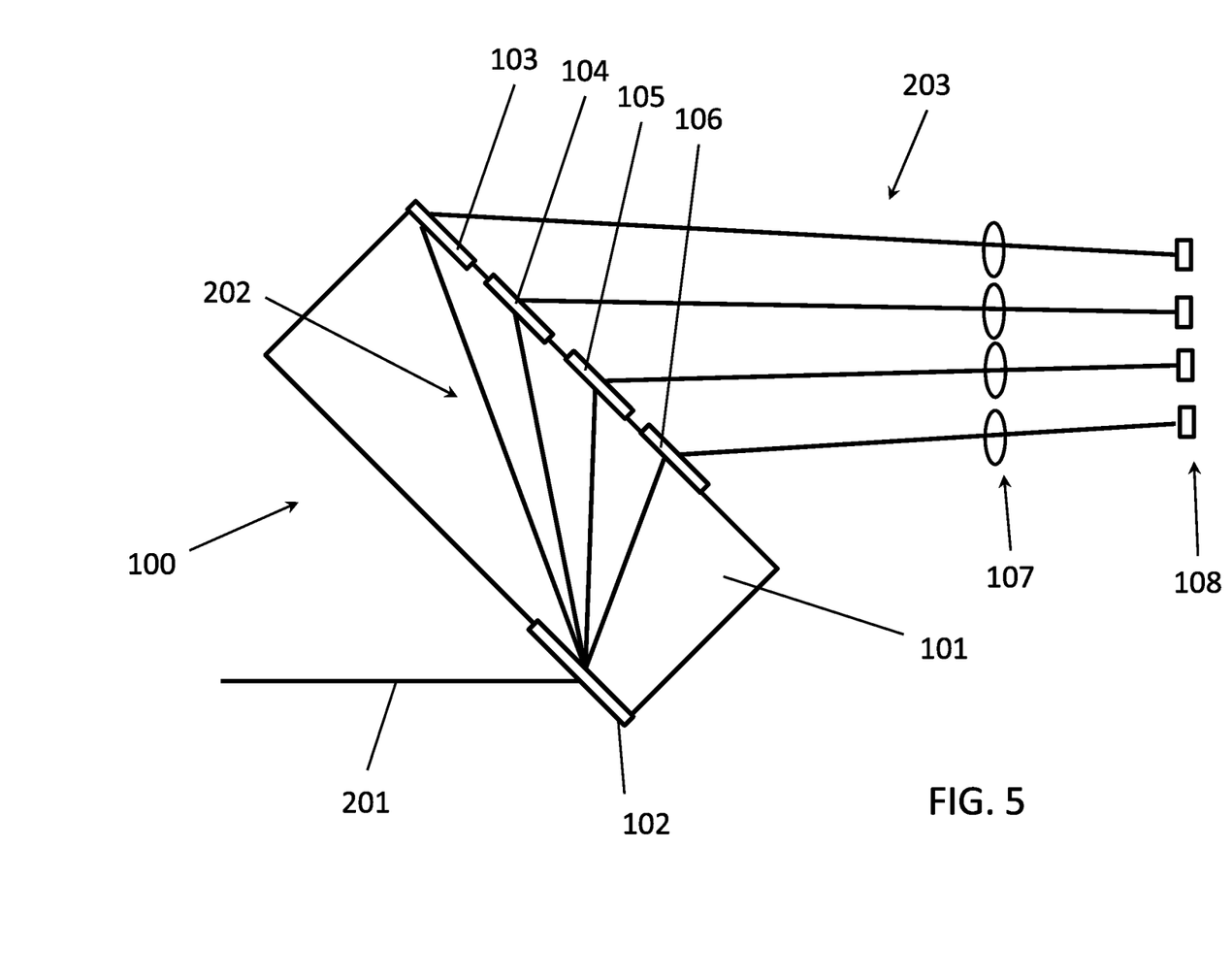

In other examples, the output gratings 103 through 106 can be transmission gratings that have grating line spacings (i.e., grating wavevector magnitudes) that are different from each other and selected for each corresponding optical signal wavelength. In such an arrangement, the demultiplexed beam paths 203 can be made into a diverging (as in FIG. 4), parallel, or converging (as in FIG. 5) array of optical signal beams (referring to the relative propagation directions of the separate demultiplexed beam paths, not to the convergence or divergence properties of each beam individually; see below). Similar behavior can be achieved using a single grating that has a grating line spacing (i.e., grating wavevector magnitude) that varies across the single grating; that variation of grating line spacing can take the form of (i) distinct areas of the single diffractive optical element each exhibiting a substantially uniform grating line spacing that differs from the other distinct areas thereof, (ii) a single, contiguous diffractive optical element over which the grating line spacing smoothly varies (e.g., a linearly chirped diffraction grating), or (iii) other suitable spatial variation or grating wavevector magnitude or direction.

Figure 6:
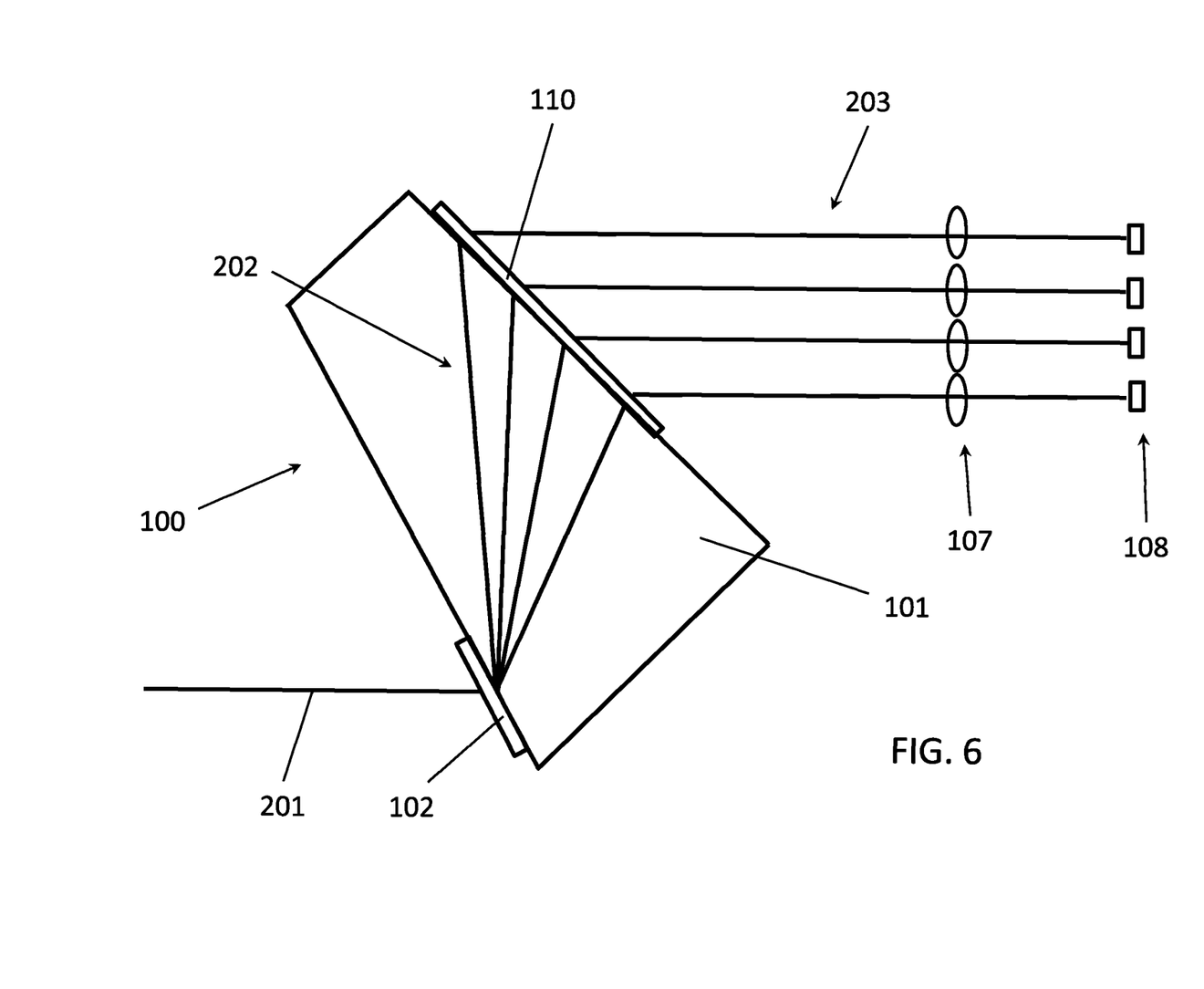
Figure 7:
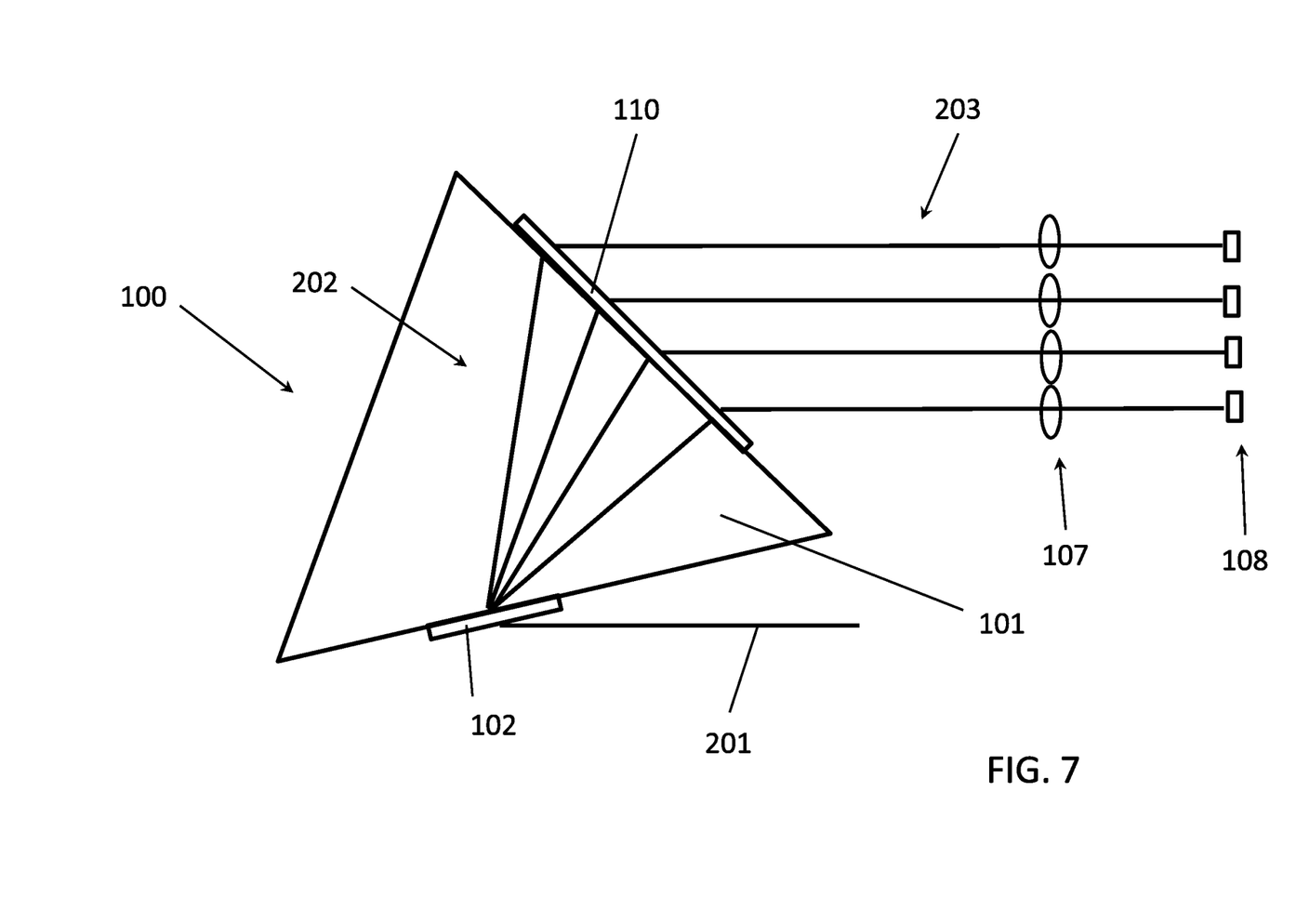
Figure 8:
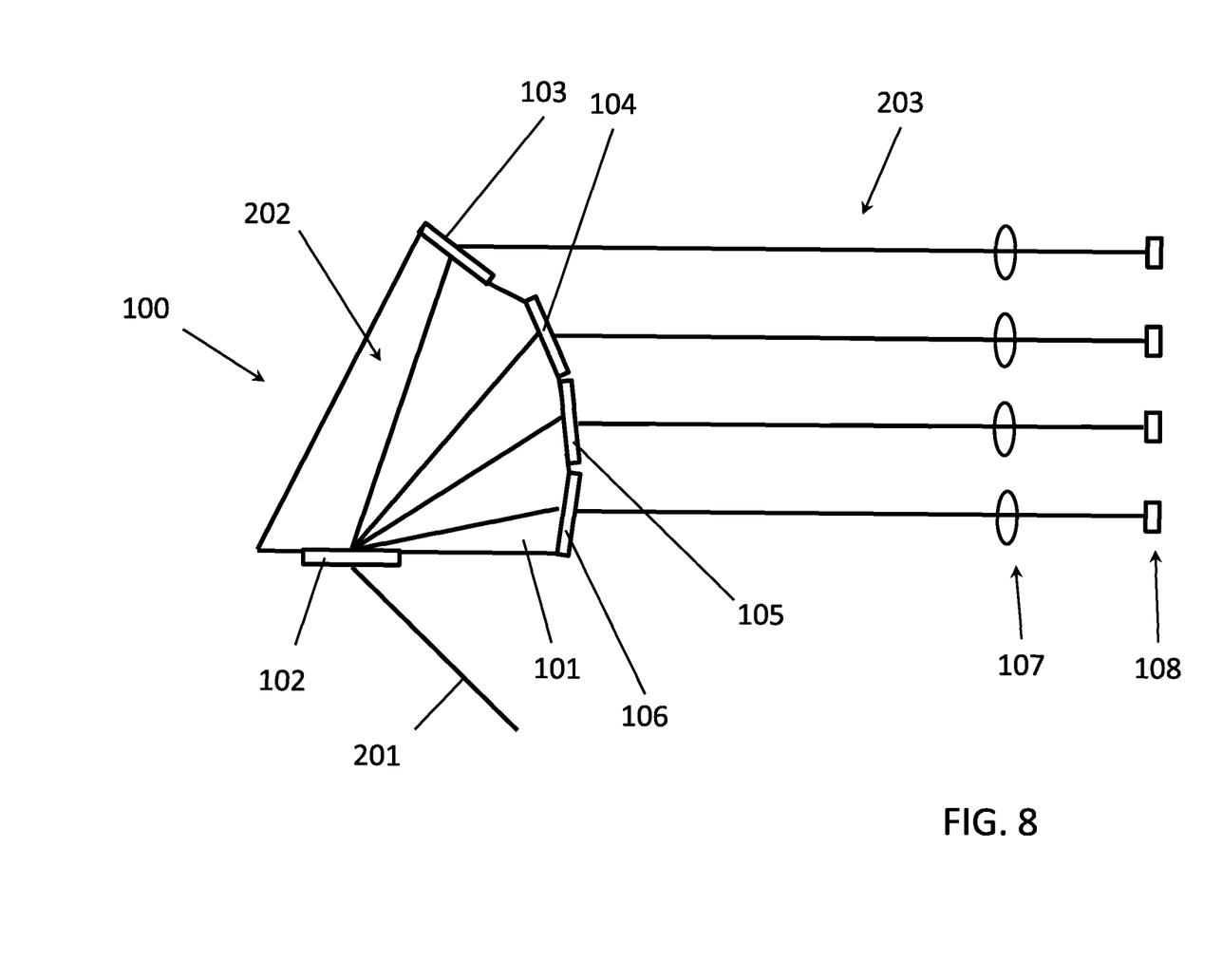

In the preceding examples the opposing input and output faces of the optical spacer 101 (and the input and output diffractive optical elements thereon) are substantially planar and substantially parallel to one another; the grating-normal vectors, at the multiplexed transmission region of the diffractive optical element 102 and at the demultiplexed transmission regions of the diffractive optical element 110, are substantially parallel to one another. In the examples of FIGS. 6 through 8, the input and output faces are non-parallel, hence the grating-normal vector at the multiplexed transmission region is not parallel to the grating-normal vectors of the demultiplexed transmission regions. The angle between them is an additional parameter that can be exploited in designing a specific multiplexer or demultiplexer geometry; the incidence angles for each corresponding wavelength at the demultiplexed transmission regions on the output diffractive optical element 110 need not be the same as the diffracted angles at the multiplexed transmission regions from the input diffractive optical element 102. Setting the incidence angle on the diffractive optical element 110 independently of the diffraction angle from the diffractive optical element 102 enables additional control of the overall wavelength dependent dispersion (of both lateral displacement and propagation direction) of a multiplexer or demultiplexer. The input and output diffractive optical elements (with the same or differing grating wavevector magnitudes or directions) can be located on non-parallel opposing sides of the optical spacer 101 (as in FIG. 6; grating-normal vectors at demultiplexed transmission regions parallel to one another but not parallel to grating-normal vector at multiplexed transmission region), on non-parallel adjacent faces of the optical spacer 101 (as in FIG. 7; grating-normal vectors at demultiplexed transmission regions parallel to one another but not parallel to grating-normal vector at multiplexed transmission region), or on multiple non-parallel faces of the optical spacer 101 (as in FIG. 8; grating-normal vectors at demultiplexed transmission regions not parallel to one another or to grating-normal vector at multiplexed transmission region). The arrangement of FIG. 8, with each output DOE on its own corresponding output face, enables fully independent control of the incidence angle at each demultiplexed transmission region.

In the examples of FIGS. 1 and 2, optical signals at evenly spaced wavelengths do not result in demultiplexed beam paths 203 that are evenly spaced laterally (due to the non-linearity of the grating equation). However, it can be desirable to employ a substantially linear array of evenly spaced light sources (for a multiplexer) or photodetectors (for a demultiplexer). The various arrangements shown in FIGS. 3 through 8 can be suitably arranged to enable use of evenly spaced optoelectronic components for multiplexing or demultiplexing optical signals at evenly spaced wavelengths. In particular, an arrangement can be employed that results in substantially parallel, substantially evenly spaced demultiplexed beam paths 203.

In the first and other examples, the transmission gratings can be of substantially constant pitch or spacing with substantially straight, substantially parallel grating lines (i.e., grating wavevector and magnitude substantially constant across the grating). In other different examples, the gratings can incorporate one- or two-dimensional wavefront transforming capability (such as focusing or defocusing, collimation, or correction of input beam phase distortions) by including gratings lines that are curved or have varying spacing (i.e., grating wavevector or magnitude varying across the grating; see, e.g., U.S. Pat. Nos. 7,349,599; 7,519,248; 7,676,128; 7,840,106; and 8,068,709, each of which is incorporated by reference). In one example, the input beam can be a diverging signal originating from an optical fiber or waveguide and the input diffractive optical element 102 can impose collimation or focusing along the diffracted beam paths 202 or along the demultiplexed beam paths 203. Focusing function provided by the first diffractive optical element 102 can replace or augment the lens array 107, which can then be omitted in some cases. In another example, the first diffractive optical element 102 can substantially collimate the diffracted beams 202 and the array of gratings 103 through 106 can impose focusing on the output beams 203 (in some cases augmenting or replacing the lens array 107). In various examples, a focusing or collimating lens can be located before the input diffractive optical element 102 (i.e., in the multiplexed beam path 201), instead of or in addition to the lens array 107 or focusing, defocusing, or collimation properties of the gratings 102 or 103 through 106. In these various examples, the focusing function, provided by a lens or other focusing element or by spatially varying grating wavevector magnitude or direction of the diffractive optical element 102, can serve to optically couple the multiplexed beam path 201 to an optical fiber or waveguide that carries the multiplexed optical signal.

Under certain circumstances, a focusing diffractive optical element 102 might impart undesirable aberrations on the diffracted optical signals at wavelengths sufficiently far from a design wavelength of the element 102. Important parameters such as the minimum focal spot diameter and focal distance for signals at other wavelengths can deviate from those obtained at the design wavelength. In some examples, the other diffractive optical element (i.e., gratings 103-106 or grating 110) can be arranged (e.g., according to the teachings of the references incorporated above) to impart aberration correction on the optical signals diffracted at the corresponding demultiplexed transmission regions. For example, the gratings 103 through 106 can be arranged specifically to compensate phase distortions (at the respective different optical signal wavelengths) imparted by the diffractive optical element 102 (arranged according to a single design wavelength).

The wavelengths of the co-propagating optical telecommunication channel signals in the incident beam might not be precisely controlled, but might instead fall into a specified range around a central channel wavelength. For example, in optical data transmission, the wavelengths of communication channels typically are only controlled only to within about ±5 nm, e.g., 850 nm±5 nm or 880 nm±5 nm. In the demultiplexer example of FIG. 1, deviation of the wavelength of one of the optical signals from its central channel value causes a corresponding change in the diffraction angle of that signal. At the backside of the optical spacer 101, the diffracted signal will impinge on the corresponding output diffractive optical element (e.g., grating 103) at a different position than if its wavelength was at the central channel value. In an embodiment wherein both input and output diffractive optical elements are constant pitch transmission gratings, this displacement would result in a lateral (vertical in FIG. 1) offset of the corresponding demultiplexed beam path 203, so that the beam in question might partially or wholly miss the aperture of its corresponding lens 107 or photodetector 108, thus leading to undesirable signal loss. In some examples, for each communications channel, a separate, corresponding transmission grating can be employed with a grating line density that varies spatially across the grating (e.g., a chirped grating). The varying grating line density can be arranged so as to at least partly compensate for concomitant variations in signal wavelength and incident location on the grating, so that the diffracted signal is directed toward its corresponding lens 107 and photodetector 108 in spite of fluctuations in its wavelength, thus reducing or avoiding signal loss due to those fluctuations.

Such a compensatory arrangement can be employed in a multiplexer as well. The diffractive optical element 102 (i.e., the output diffractive optical element in the multiplexer case) can be arranged with a spatially varying grating line density, so that if the wavelength of one of the light sources fluctuates, its beam (diffracted from one of the gratings 103 through 106) hits the diffractive optical element 102 at a different location having a different grating line spacing and is directed into a receiving optical fiber (e.g., multimode fiber) despite the wavelength and position fluctuation. Without the compensatory arrangement, wavelength fluctuations of the output signal would result in signal loss due to the diffracted beam partially or wholly missing the receiving optical fiber.

In the example arrangements described and shown, the optical spacer 101 has been depicted as a substantially optical transparent volume of solid material (e.g., glass, silica, semiconductor, dielectric) on whose opposing faces the input and output diffractive optical elements are located. However, multiplexers or demultiplexers can be fashioned according to the present disclosure in which the optical spacer is an enclosed volume, either substantially evacuated or containing a liquid or gaseous medium (e.g., air, nitrogen, inert gas, water, immersion oil, index-matching fluid) with the diffractive optical elements (which at least partly bound the enclosed volume) held in position mechanically, e.g., by mounting them in slots, frames, or other fixtures or mounts.

In addition to the preceding, the following examples fall within the scope of the present disclosure or appended claims:

EXAMPLE 1

An optical apparatus comprising first and second transmissive diffractive optical elements, wherein: (a) the first and second diffractive optical elements are held in substantially fixed positions relative to one another; (b) the first diffractive optical element includes a multiplexed transmission region characterized by a corresponding average grating-normal vector direction, a corresponding average grating wavevector magnitude, and a corresponding average grating wavevector direction; (c) the second diffractive optical element includes multiple demultiplexed transmission regions that are spatially displaced from one another, each of which is characterized by a corresponding average grating-normal vector direction, a corresponding average grating wavevector magnitude, and a corresponding average grating wavevector direction; (d) each demultiplexed transmission region differs from at least one other demultiplexed transmission region with respect to one or more of the grating-normal vector direction, the grating wavevector magnitude, or the grating wavevector direction; (e) the relative positions of the first and second diffractive optical elements, the grating-normal vector directions, the grating wavevector magnitudes, and the grating wavevector directions are such that each one of a set of multiple optical signals, at corresponding different selected signal wavelengths in an operational wavelength range, co-propagating to the multiplexed transmission region along a multiplexed beam path would (i) be transmissively, dispersively diffracted by the first diffractive optical element, (ii) propagate directly, without any intervening reflection, between the multiplexed transmission region and a corresponding one of the demultiplexed transmission regions, (iii) be transmissively, dispersively diffracted by the second diffractive optical element, and (iv) propagate from the corresponding demultiplexed transmission region along a corresponding one of multiple demultiplexed beam paths.

EXAMPLE 2

The optical apparatus of Example 1 further comprising an optical spacer structurally arranged to hold the first and second diffractive optical elements in the substantially fixed positions.

EXAMPLE 3

The optical apparatus of Example 2 wherein: the optical spacer comprises a contiguous volume of substantially rigid solid material substantially transparent over the operational wavelength range; the first diffractive optical element is positioned on a first surface of the solid material and the second diffractive optical element is positioned on a second surface of the solid material; and optical signals propagating between the multiplexed transmission region and one of the demultiplexed transmission regions propagate within the solid material without any internal reflection.

EXAMPLE 4

The optical apparatus of Example 3 wherein: the first diffractive optical element comprises a diffraction grating on a first grating substrate attached to the first surface of the solid material; and the second diffractive optical element comprises one or more diffraction gratings on a second grating substrate attached to the second surface of the solid material.

EXAMPLE 5

The optical apparatus of Example 3 wherein: the first diffractive optical element comprises a diffraction grating formed on the first surface of the solid material; and the second diffractive optical element comprises one or more diffraction gratings formed on the second surface of the solid material.

EXAMPLE 6

The optical apparatus of Example 3 wherein the solid material comprises one or more of glass, silica, doped silica, a polymer or resin, a dielectric material, or a semiconductor material.

EXAMPLE 7

The optical apparatus of Example 3 wherein: the first diffractive optical element comprises a diffraction grating on a first surface of a first grating substrate; the second diffractive optical element comprises one or more diffraction gratings on a first surface of a second grating substrate; the first diffractive optical element is attached to the second diffractive optical element with a second surface of the first grating substrate positioned against a second surface of the second grating substrate; and the first and second grating substrates form the optical spacer.

EXAMPLE 8

The optical apparatus of Example 2 wherein: the optical spacer comprises a contiguous enclosed volume; wherein the enclosed volume is substantially evacuated or contains a gaseous or liquid material substantially transparent over the operational wavelength range; the first diffractive optical element forms a first boundary surface of the enclosed volume and the second diffractive optical element forms a second boundary surface of the enclosed volume; and optical signals propagating between the multiplexed transmission region and one of the demultiplexed transmission regions propagate within the optical spacer without any internal reflection.

EXAMPLE 9

The optical apparatus of any preceding Example wherein the grating-normal vector directions of the demultiplexed transmission regions are substantially parallel to one another.

EXAMPLE 10

The optical apparatus of Example 9 wherein the grating-normal vector directions of the demultiplexed transmission regions are substantially parallel to the grating-normal vector direction of the multiplexed transmission region.

EXAMPLE 11

The optical apparatus of any one of Examples 1-8 wherein each demultiplexed transmission region differs from at least one other demultiplexed transmission region with respect to the grating-normal vector direction.

EXAMPLE 12

The optical apparatus of any preceding Example wherein each demultiplexed transmission region differs from at least one other demultiplexed transmission region with respect to grating wavevector magnitude or direction.

EXAMPLE 13

The optical apparatus of Example 12 wherein (i) the second diffractive optical element comprises multiple distinct transmission diffraction gratings and (ii) each distinct diffraction grating includes one of the demultiplexed transmission regions.

EXAMPLE 14

The optical apparatus of Example 12 wherein the second diffractive optical element comprises a single transmission diffraction grating having spatially varying grating wavevector magnitude or direction.

EXAMPLE 15

The optical apparatus of any preceding Example wherein the demultiplexed beam paths are substantially parallel to one another.

EXAMPLE 16

The optical apparatus of Example 15 wherein the demultiplexed beam paths are substantially evenly spaced apart.

EXAMPLE 17

The optical apparatus of Example 15 wherein the demultiplexed beam paths are substantially parallel to the multiplexed beam path.

EXAMPLE 18

The optical apparatus of any preceding Example further comprising a focusing optical element structurally arranged to optically couple the multiplexed beam path to an optical fiber or waveguide.

EXAMPLE 19

The optical apparatus of any preceding Example wherein the first diffractive optical element is structurally arranged so as act as a focusing optical element to optically couple the multiplexed beam path to an optical fiber or waveguide.

EXAMPLE 20

The optical apparatus of any preceding Example wherein (i) the first diffractive optical element is structurally arranged so as act as a focusing optical element and (ii) each demultiplexed transmission region is structurally arranged so as to compensate for aberrations imparted by the first diffractive optical element on the corresponding optical signal.

EXAMPLE 21

The optical apparatus of any preceding Example wherein the operation wavelength range is (i) about 800 nm to about 900 nm or (ii) about 1200 nm to about 1700 nm.

EXAMPLE 22

The optical apparatus of any one of Examples 1-21 further comprising a set of multiple photodetectors sensitive to optical signals in the operational wavelength range, wherein each photodetector is positioned so as to receive an optical signal in the operational wavelength range propagating from a corresponding one of the demultiplexed transmission regions along the corresponding one of the demultiplexed beam paths.

EXAMPLE 23

The optical apparatus of Example 22 wherein the set of multiple photodetectors comprises a substantially linear array of three or more substantially evenly spaced photodetectors.

EXAMPLE 24

The optical apparatus of Example 22 further comprising a set of multiple focusing optical elements, wherein each focusing optical element is structurally arranged to optically couple a corresponding one of the demultiplexed beam paths to the corresponding one of the photodetectors.

EXAMPLE 25

The optical apparatus of Example 22 wherein each demultiplexed transmission region is structurally arranged so as to act as a focusing optical element to optically couple the corresponding one of the demultiplexed beam paths to the corresponding one of the photodetectors.

EXAMPLE 26

A method for using the optical apparatus of any one of Examples 22-25, the method comprising: directing a multiplexed optical signal to propagate along the multiplexed beam path to the multiplexed transmission region of the first diffractive optical element, wherein the multiplexed optical signal comprises a corresponding optical signal at each of two or more different corresponding wavelengths among the selected wavelengths; and receiving each corresponding optical signal at the corresponding photodetector, wherein each corresponding optical signal propagates from the corresponding demultiplexed transmission region of the second diffractive optical element along the corresponding demultiplexed beam path to the corresponding photodetector.

EXAMPLE 27

The optical apparatus of any one of Examples 1-25 further comprising a set of multiple light sources, wherein each light source emits an optical signal at one of the selected wavelengths in the operational wavelength range and is positioned so as to launch that optical signal to propagate (i) from the light source along a corresponding one of the demultiplexed beam paths to the corresponding demultiplexed transmission region, (ii) from the corresponding demultiplexed transmission region to the multiplexed transmission region, and (iii) along the multiplexed beam path.

EXAMPLE 28

The optical apparatus of Example 27 wherein the set of multiple light sources comprises a substantially linear array of three or more substantially evenly spaced light sources.

EXAMPLE 29

The optical apparatus of Example 27 further comprising a set of multiple focusing optical elements, wherein each focusing optical element is structurally arranged to optically couple a corresponding one of the demultiplexed beam paths to the corresponding one of the light sources.

EXAMPLE 30

The optical apparatus of Example 27 wherein each demultiplexed transmission region is structurally arranged so as to act as a focusing optical element to optically couple the corresponding one of the demultiplexed beam paths to the corresponding one of the light sources.

EXAMPLE 31

A method for using the optical apparatus of any one of Examples 27-30, the method comprising emitting a corresponding optical signal from each of two or more of the light sources at two or more different corresponding wavelengths among the selected wavelengths to propagate along the corresponding demultiplexed beam path to the corresponding demultiplexed transmission region or the second diffractive optical element, wherein the corresponding optical signals propagate from the multiplexed transmission region of the first diffractive optical element along the multiplexed beam path as a multiplexed optical signal.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise.

In the appended claims, if the provisions of 35 USC §112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An optical apparatus comprising first and second transmissive diffractive optical elements, wherein:
    the first and second diffractive optical elements are held in substantially fixed positions relative to one another;
    the first diffractive optical element includes a multiplexed transmission region characterized by a corresponding average grating-normal vector direction, a corresponding average grating wavevector magnitude, and a corresponding average grating wavevector direction;
    the second diffractive optical element includes multiple demultiplexed transmission regions that are spatially displaced from one another, each of which is characterized by a corresponding average grating-normal vector direction, a corresponding average grating wavevector magnitude, and a corresponding average grating wavevector direction;
    each demultiplexed transmission region differs from at least one other demultiplexed transmission region with respect to one or more of the grating-normal vector direction, the grating wavevector magnitude, or the grating wavevector direction;
    the relative positions of the first and second diffractive optical elements, the grating-normal vector directions, the grating wavevector magnitudes, and the grating wavevector directions are such that each one of a set of multiple optical signals, at corresponding different selected signal wavelengths in an operational wavelength range, co-propagating to the multiplexed transmission region along a multiplexed beam path would (i) be transmissively, dispersively diffracted by the first diffractive optical element, (ii) propagate directly, without any intervening reflection, between the multiplexed transmission region and a corresponding one of the demultiplexed transmission regions different from a demultiplexed transmission region of at least one other of the multiple optical signals, (iii) be transmissively, dispersively diffracted by the second diffractive optical element, and (iv) propagate from the corresponding demultiplexed transmission region along a corresponding one of multiple demultiplexed beam paths.

2. The optical apparatus of claim 1 further comprising a set of multiple photodetectors sensitive to optical signals in the operational wavelength range, wherein each photodetector is positioned so as to receive an optical signal in the operational wavelength range propagating from a corresponding one of the demultiplexed transmission regions along the corresponding one of the demultiplexed beam paths.

3. The optical apparatus of claim 2 wherein the set of multiple photodetectors comprises a substantially linear array of three or more substantially evenly spaced photodetectors.

4. The optical apparatus of claim 2 further comprising a set of multiple focusing optical elements, wherein each focusing optical element is structurally arranged to optically couple a corresponding one of the demultiplexed beam paths to the corresponding one of the photodetectors.

5. The optical apparatus of claim 2 wherein each demultiplexed transmission region is structurally arranged so as to act as a focusing optical element to optically couple the corresponding one of the demultiplexed beam paths to the corresponding one of the photodetectors.

6. The optical apparatus of claim 1 further comprising a set of multiple light sources, wherein each light source emits an optical signal at one of the selected wavelengths in the operational wavelength range and is positioned so as to launch that optical signal to propagate (i) from the light source along a corresponding one of the demultiplexed beam paths to the corresponding demultiplexed transmission region, (ii) from the corresponding demultiplexed transmission region to the multiplexed transmission region, and (iii) along the multiplexed beam path.

7. The optical apparatus of claim 6 wherein the set of multiple light sources comprises a substantially linear array of three or more substantially evenly spaced light sources.

8. The optical apparatus of claim 6 further comprising a set of multiple focusing optical elements, wherein each focusing optical element is structurally arranged to optically couple a corresponding one of the demultiplexed beam paths to the corresponding one of the light sources.

9. The optical apparatus of claim 6 wherein each demultiplexed transmission region is structurally arranged so as to act as a focusing optical element to optically couple the corresponding one of the demultiplexed beam paths to the corresponding one of the light sources.

10. The optical apparatus of claim 1 further comprising an optical spacer structurally arranged to hold the first and second diffractive optical elements in the substantially fixed positions.

11. The optical apparatus of claim 10 wherein:
the optical spacer comprises a contiguous volume of substantially rigid solid material substantially transparent over the operational wavelength range;
the multiplexed transmission region of the first diffractive optical element is positioned on a first surface of the solid material and the multiple demultiplexed transmission regions of the second diffractive optical element are positioned on one or more additional surfaces of the solid material; and
optical signals propagating between the multiplexed transmission region and one of the demultiplexed transmission regions propagate within the solid material without any internal reflection.

12. The optical apparatus of claim 11 wherein:
the first diffractive optical element comprises a diffraction grating on a first grating substrate attached to the first surface of the solid material; and
the second diffractive optical element comprises one or more diffraction gratings on one or more corresponding second grating substrates attached to the one or more additional surfaces of the solid material.

13. The optical apparatus of claim 11 wherein:
the first diffractive optical element comprises a diffraction grating formed on the first surface of the solid material; and
the second diffractive optical element comprises one or more diffraction gratings formed on the one or more additional surfaces of the solid material.

14. The optical apparatus of claim 11 wherein the solid material comprises one or more of glass, silica, doped silica, a polymer or resin, a dielectric material, or a semiconductor material.

15. The optical apparatus of claim 10 wherein:
the first diffractive optical element comprises a diffraction grating on a grating surface of a first grating substrate;
the second diffractive optical element comprises one or more diffraction gratings on one or more grating surfaces of a second grating substrate;
the first diffractive optical element is attached to the second diffractive optical element with a non-grating surface of the first grating substrate positioned against a non-grating surface of the second grating substrate; and
the first and second grating substrates form the optical spacer.

16. The optical apparatus of claim 10 wherein:
the optical spacer comprises a contiguous enclosed volume;
wherein the enclosed volume is substantially evacuated or contains a gaseous or liquid material substantially transparent over the operational wavelength range;
the first diffractive optical element forms a first boundary surface of the enclosed volume and the second diffractive optical element forms one or more second boundary surfaces of the enclosed volume; and
optical signals propagating between the multiplexed transmission region and one of the demultiplexed transmission regions propagate within the optical spacer without any internal reflection.

17. The optical apparatus of claim 1 wherein the grating-normal vector directions of the demultiplexed transmission regions are substantially parallel to one another.

18. The optical apparatus of claim 17 wherein the grating-normal vector directions of the demultiplexed transmission regions are substantially parallel to the grating-normal vector direction of the multiplexed transmission region.

19. The optical apparatus of claim 1 wherein one or more of the multiple demultiplexed transmission regions of the second diffractive optical element differ from the multiplexed transmission region of the first diffractive optical element with respect to the grating-normal vector direction.

20. The optical apparatus of claim 1 wherein each demultiplexed transmission region differs from at least one other demultiplexed transmission region with respect to grating wavevector magnitude or direction.

21. The optical apparatus of claim 20 wherein (i) the second diffractive optical element comprises multiple distinct transmission diffraction gratings and (ii) each distinct diffraction grating includes one of the demultiplexed transmission regions.

22. The optical apparatus of claim 20 wherein the second diffractive optical element comprises a single transmission diffraction grating having spatially varying grating wavevector magnitude or direction.

23. The optical apparatus of claim 1 wherein the demultiplexed beam paths are substantially parallel to one another.

24. The optical apparatus of claim 23 wherein the demultiplexed beam paths are substantially evenly spaced apart.

25. The optical apparatus of claim 23 wherein the demultiplexed beam paths are substantially parallel to the multiplexed beam path.

26. The optical apparatus of claim 1 further comprising a focusing optical element structurally arranged to optically couple the multiplexed beam path to an optical fiber or waveguide.

27. The optical apparatus of claim 1 wherein the first diffractive optical element is structurally arranged so as act as a focusing optical element to optically couple the multiplexed beam path to an optical fiber or waveguide.

28. The optical apparatus of claim 1 wherein (i) the first diffractive optical element is structurally arranged so as act as a focusing optical element and (ii) each demultiplexed transmission region is structurally arranged so as to compensate for aberrations imparted by the first diffractive optical element on the corresponding optical signal.

29. The optical apparatus of claim 1 wherein the operation wavelength range is (i) about 800 nm to about 900 nm or (ii) about 1200 nm to about 1700 nm.

30. A method comprising:
directing a multiplexed optical signal to propagate along a multiplexed beam path to a multiplexed transmission region of a first diffractive optical element, wherein the multiplexed optical signal comprises an optical signal at each of two or more different corresponding wavelengths among selected wavelengths in an operational wavelength range; and
receiving each corresponding optical signal at a corresponding one of a set of multiple photodetectors that are sensitive to optical signals in the operational wavelength range,
wherein:
the first and second diffractive optical elements are held in substantially fixed positions relative to one another;
the first diffractive optical element includes the multiplexed transmission region characterized by a corresponding average grating-normal vector direction, a corresponding average grating wavevector magnitude, and a corresponding average grating wavevector direction;
a second diffractive optical element includes multiple demultiplexed transmission regions that are spatially displaced from one another, each of which is characterized by a corresponding average grating-normal vector direction, a corresponding average grating wavevector magnitude, and a corresponding average grating wavevector direction;

each demultiplexed transmission region differs from at least one other demultiplexed transmission region with respect to one or more of the grating-normal vector direction, the grating wavevector magnitude, or the grating wavevector direction;

the relative positions of the first and second diffractive optical elements, the grating-normal vector directions, the grating wavevector magnitudes, and the grating wavevector directions are such that each one of the optical signals, co-propagating to the multiplexed transmission region along the multiplexed beam path, (i) is transmissively, dispersively diffracted by the first diffractive optical element, (ii) propagates directly, without any intervening reflection, between the multiplexed transmission region and a corresponding one of the demultiplexed transmission regions different from a demultiplexed transmission region of at least one other of the multiple optical signals, (iii) is transmissively, dispersively diffracted by the second diffractive optical element, and (iv) propagates from the corresponding demultiplexed transmission region along a corresponding one of multiple demultiplexed beam paths; and each one of the optical signals propagates from the corresponding one of the demultiplexed transmission regions of the second diffractive optical element along the corresponding one of the demultiplexed beam paths to the corresponding one of the multiple photodetectors.

31. A method comprising emitting a corresponding optical signal from each one of two or more light sources, at two or more different corresponding wavelengths among selected wavelengths in an operational wavelength range, to propagate along multiple corresponding demultiplexed beam paths to multiple corresponding demultiplexed transmission regions of a second diffractive optical element, wherein:

a first diffractive optical element and the second diffractive optical element are held in substantially fixed positions relative to one another;

the first diffractive optical element includes a multiplexed transmission region characterized by a corresponding average grating-normal vector direction, a corresponding average grating wavevector magnitude, and a corresponding average grating wavevector direction;

the second diffractive optical element includes the multiple demultiplexed transmission regions that are spatially displaced from one another, each of which is characterized by a corresponding average grating-normal vector direction, a corresponding average grating wavevector magnitude, and a corresponding average grating wavevector direction;

each demultiplexed transmission region differs from at least one other demultiplexed transmission region with respect to one or more of the grating-normal vector direction, the grating wavevector magnitude, or the grating wavevector direction;

the relative positions of the first and second diffractive optical elements, the grating-normal vector directions, the grating wavevector magnitudes, and the grating wavevector directions are such that each one of the optical signals, propagating to the corresponding one of the multiple demultiplexed transmission regions, different from a demultiplexed transmission region of at least one other of the multiple optical signals, along a corresponding one of the demultiplexed beam paths, (i) is transmissively, dispersively diffracted by the second diffractive optical element, (ii) propagates directly, without any intervening reflection, between the corresponding one of the demultiplexed transmission regions and the multiplexed transmission region, (iii) is transmissively, dispersively diffracted by the first diffractive optical element, and (iv) propagates from the multiplexed transmission region along the multiplexed beam path; and the corresponding optical signals co-propagate from the multiplexed transmission region of the first diffractive optical element along the multiplexed beam path as a multiplexed optical signal.

* * * * *